United States Patent [19]
Coulter et al.

[11] 3,757,213
[45] Sept. 4, 1973

[54] PARTICLE SIZE ANALYZING APPARATUS AND METHOD USING THRESHOLD LEVEL CONTROL

[75] Inventors: Wallace H. Coulter, Miami Springs; Walter R. Hogg, Miami Lakes, both of Fla.

[73] Assignee: Coulter Electronics, Inc., Hialeah, Fla.

[22] Filed: May 25, 1970

[21] Appl. No.: 40,231

[52] U.S. Cl. ........................ 324/71 CP, 235/92 PC
[51] Int. Cl. .......................................... G01n 27/00
[58] Field of Search ...................... 324/71 CP, 71 R, 324/103 R, 103 P, 102; 328/116, 151; 356/102, 103; 307/265; 235/183, 92 PC

[56] References Cited
UNITED STATES PATENTS

| | | | |
|---|---|---|---|
| 3,331,950 | 7/1967 | Coulter et al. | 324/71 CP |
| 2,424,689 | 7/1947 | Hamill | 324/103 R |
| 2,656,508 | 10/1953 | Coulter | 324/71 CP |
| 3,461,280 | 8/1969 | Vitt et al. | 356/102 X |
| 3,259,842 | 7/1966 | Coulter et al. | 324/71 PC |
| 3,153,727 | 10/1964 | Nathan | 356/102 X |
| 3,345,502 | 10/1967 | Berg et al. | 324/71 CP |

*Primary Examiner*—Rudolph V. Rolinec
*Assistant Examiner*—Ernest F. Karlsen
*Attorney*—Silverman and Cass

[57] ABSTRACT

The analog electrical signals from a Coulter type electronic particle analyzing apparatus are applied to a voltage-to-charge converter, only those signals having amplitudes which exceed a pre-selected threshold level are so applied. The resulting charges produced from all of the applied signals are accumulated in a device, such as an integrating circuit, and provide an output voltage the value of which is proportional to the total amplitudes of all applied signals.

Accumulated for a given number of the signals, the said output voltage defines an output voltage which is proportional to the mean particle volume.

Accumulated for a given volume of test suspension which is allowed to flow through the aperture of the particle analyzing apparatus, the first mentioned output signal is proportional to the ratio of total particulate volume to diluent volume.

Providing a plurality of such structures, each having its threshold level set at a different value corresponding to some particle size, a plurality of outputs is available each of which provides an output signal which is proportional to the total particulate volume in the suspension above the said particle size, so that the plotting of the plurality of output signals produces the integral curve of the particulate system being examined. Using differential responsive devices between adjacent outputs provides another set of output signals which enables the differential curve of the particulate system to be constructed.

22 Claims, 5 Drawing Figures

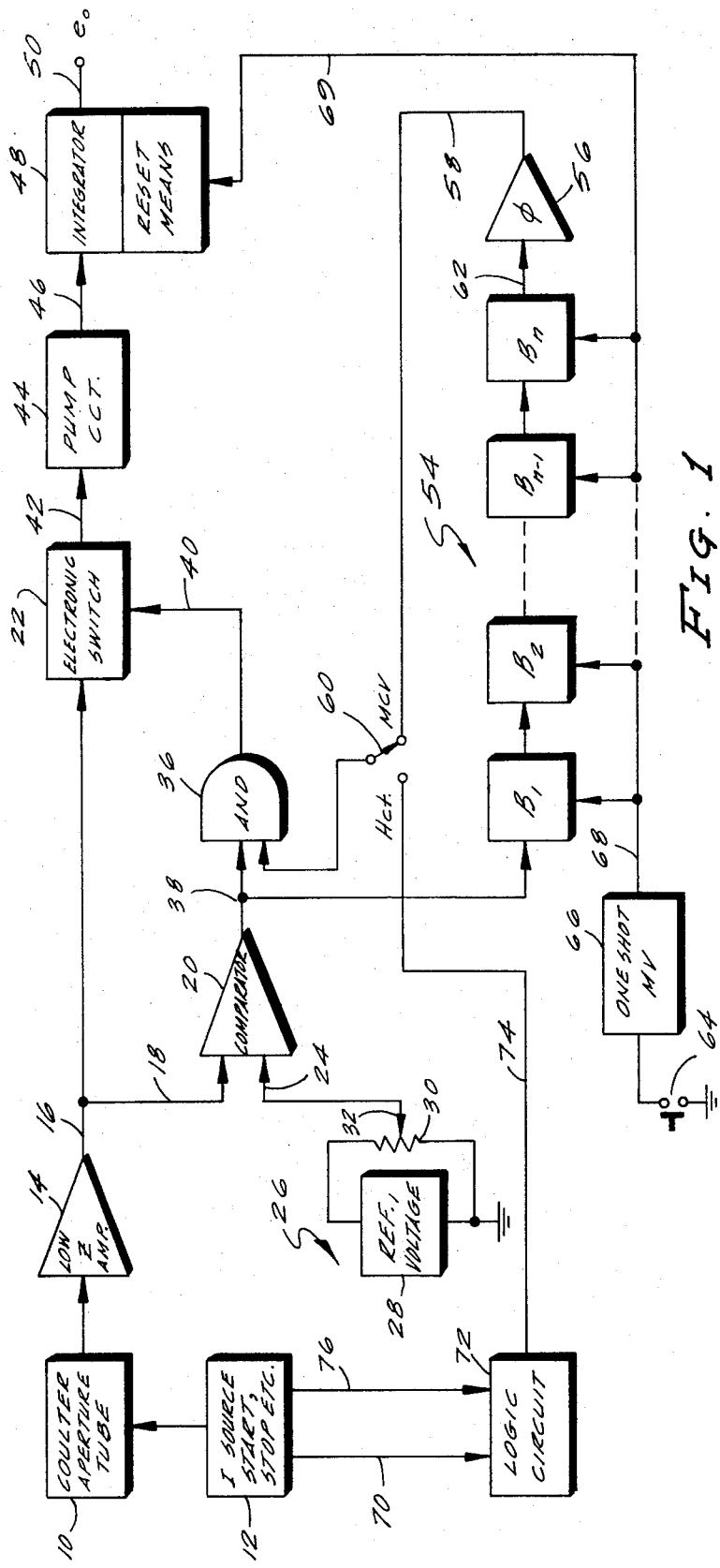
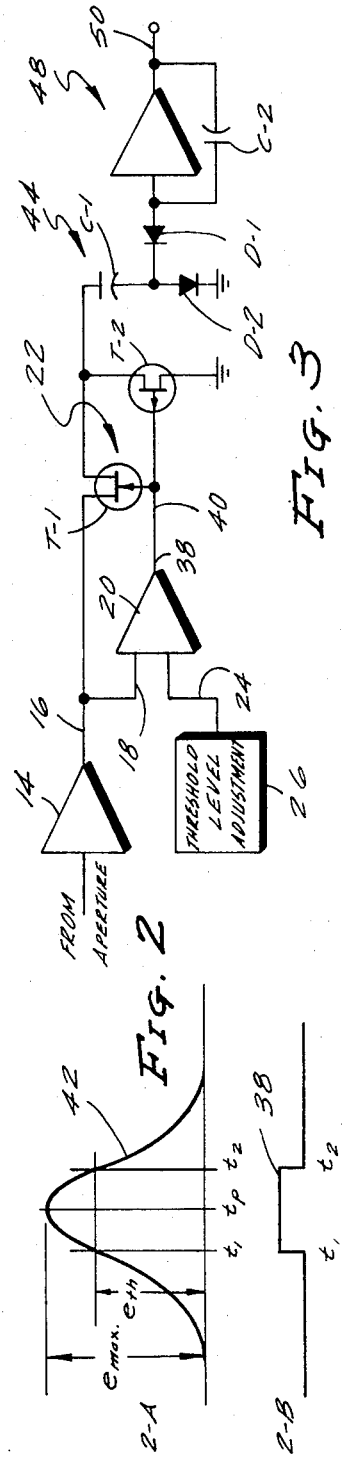

PARTICLE SIZE ANALYZING APPARATUS AND METHOD USING THRESHOLD LEVEL CONTROL

BACKGROUND OF THE INVENTION

The field of this invention is the particulate analysis field, and primarily the art of studying the physical properties of particles which are suspended in a diluent. Such properties include the concentration of particles in a given suspension, the distribution of the particles according to size and other information related to size and number. In medicine and industry, particulate systems are examined by various techniques, one of the basic tools for such examination being an electronic apparatus which operates in accordance with the Coulter principle. In such apparatus, a suspension of particles in a conducting diluent is passed relative to an electric field of small dimensions, usually in the form of a microscopic aperture in an insulating wall. An electric current flow is established to provide the field, such that in the case of an aperture, there is a physical flow of suspension through the aperture simultaneously with an electric current flow. The passage of a particle relative to the field produces a signal which is proportional to the change in the impedance of the effective aperture, and this signal can be detected, counted, etc.

U.S. Pat. No. 2,656,508 discloses the basic apparatus which utilizes this principle.

The signal which is produced is a voltage in most cases, and the amplitude is the parameter which is proportional to the size of the particle. The duration of the signal is normally the period of time that the particle occupies in passing through the aperture. The invention will be explained considering that the signals are voltages, but the signal likewise can be an electric current variation, hence no limitations are intended by describing the signals as voltages hereinafter.

The apparatus which operates in accordance with the above described principle has been utilized in many different ways to acquire information about the particulate systems being examined. The use of the apparatus for counting is achieved by passing a known volume of a particle suspension relative to the aperture of the device, the suspension having a known dilution, and using a suitable counter device to count the resulting signals.

A relatively simplified form of the apparatus has been used for a considerable length of time using a single adjustable threshold level control. The level control in any event was utilized to eliminate the random low amplitude signals caused by noise and background debris or inconsequential particles in the suspension. This was done by raising the threshold level above the highest amplitude to be rejected, as a result of which the detecting portion of the apparatus would respond only to the signals which exceeded the level. In the same apparatus, one could adjust the threshold level to any desired value for examining only particles whose size produced signals that exceeded higher settings of the threshold level. The threshold level control normally was calibrated in terms of particle size on a linear scale because of the direct proportionality between signal and particle size.

The word "size" as used herein always refers to the volume of material or substance in a particle, normally considered to be of a substantially homogeneous substance, and considered to displace its own volume of the diluent in which it is suspended.

Summarizing, by the use of the adjustable threshold level control, a common form of the Coulter type electronic particle counting device could be used for counting and sizing studies.

In another type of Coulter apparatus disclosed in U.S. Pat. No 3,259,842, two threshold level adjusting circuits are provided by means of which a "window" is established, each threshold level being independently adjustable, and there being veto circuits provided so that only signals which exceed the lower threshold level and are not higher in amplitude than the upper threshold level will pass on to counting and other responsive means of the apparatus.

In the medical and biological field, several indices are useful in connection with blood cells, for example, and in the past apparatus of the Coulter type has been used as an aid in ascertaining such indices. One such index is mean cell volume, which is a measure of average cell size needed for certain diagnostic studies. In this case, the total amount of particulate material in a given system is divided by the total number of cells in the system, and th index is the resultant. The procedures for making this determination, even utilizing the Coulter apparatus above described is difficult, requiring a great many runs with different settings of the threshold levels, and considerable computation. One apparatus has been devised which determines mean cell volume (MCV) by novel electronic circuitry which examines a histogram produced from a succession of particle-produced signals, averaging the amplitude of the histogram. Such device is disclosed in U.S. Pat. No. 3,473,010.

Another such index is the hematocrit, this being an index which is a measure of the ratio between the red cells in the blood and whole blood. A known dilution is made of a blood sample, and the particulate volume for a known volume of suspension is measured or computed to derive this index. Coulter type apparatus has been used for ascertaining this index, but again the procedure is difficult and time consuming.

There are two characteristics which are used classically to describe a particulate system in both industry and medicine, these being the integral curve and the differential curve. The integral curve is an S-shaped curve, any point along the curve representing the total particulate volume above a stated size. The differential curve is usually a bell-shaped curve representing size distribution of the particulate system.

All of the above indices and characteristics, and considerable other information can be ascertained according to this invention by extremely simple circuitry, and with accuracy which is achieved heretofore only by much more expensive and complex devices.

In deriving the integral and size distribution characteristics of a particulate system using the Coulter apparatus, heretofore it was required to utilize multi-channel analyzers where considerable studies had to be made. A plurality of ranges was chosen, each defined by a pair of threshold levels. All of the particles within each range were counted, and the average size was taken to be approximately at the middle of the range. The number of particles in the range was then multiplied by the average size in that range to provide one point on the differential curve. This was a close approximation and required considerable apparatus. For the integral characteristics the total volumes of particles in all the ranges had to be achieved, and added progressively either electronically or mathematically.

SUMMARY OF THE INVENTION

According to the invention, a Coulter type electronic particle counting and sizing apparatus is used to provide a plurality of signals representing the particles which are passing relative to the electric current path, and these signals are used to achieve the results required without the necessity of making a count. Since the known methods and apparatus for achieving an index which represents total volume have required a count, they have necessitated apparatus and/or circuitry which is obviated or at least simplified by the invention. Since the said methods and apparatus have been based upon an average size of particle arbitrarily chosen in the center of the range being examined, they have not guaranteed accuracy.

In this invention, the particles are converted from analog signals such as voltages, to electrical quantities capable of being accumulated, such as charges. Since the analog signals are proportional to particle size, if the quantities into which they are respectively converted are also proportional to such size, one need only accumulate the said quantities to achieve a total quantity proportional to total particulate volume. If, as taught by the invention, the signals whose amplitudes exceed a given threshold are the only ones which are examined, then only those particles whose sizes are greater than the size represented by the threshold level will pass to the accumulating apparatus.

The signals are converted into charges, the charges are run into an integrator and accumulated, and the output of the integrator is measured for a given volume of suspension to provide a signal that is proportional to the total amount of particulate matter that is contained in the volume of suspension that is passed. An electronic switching circuit is used to choose the pulses which exceed the threshold, and a pump circuit or the like is used to convert the signals to charge and pass them into the integrator.

BRIEF DESCRIPTION OF THE DRAWINGS

FIG. 1 is a block diagram illustrating the circuitry of the invention.

FIG. 2 is a chart showing in two parts a particle-derived pulse and a control signal which in turn is derived from the first pulse.

FIG. 3 is a circuit diagram of a modified form of the invention.

DESCRIPTION OF THE PREFERRED EMBODIMENTS

Figure 4:
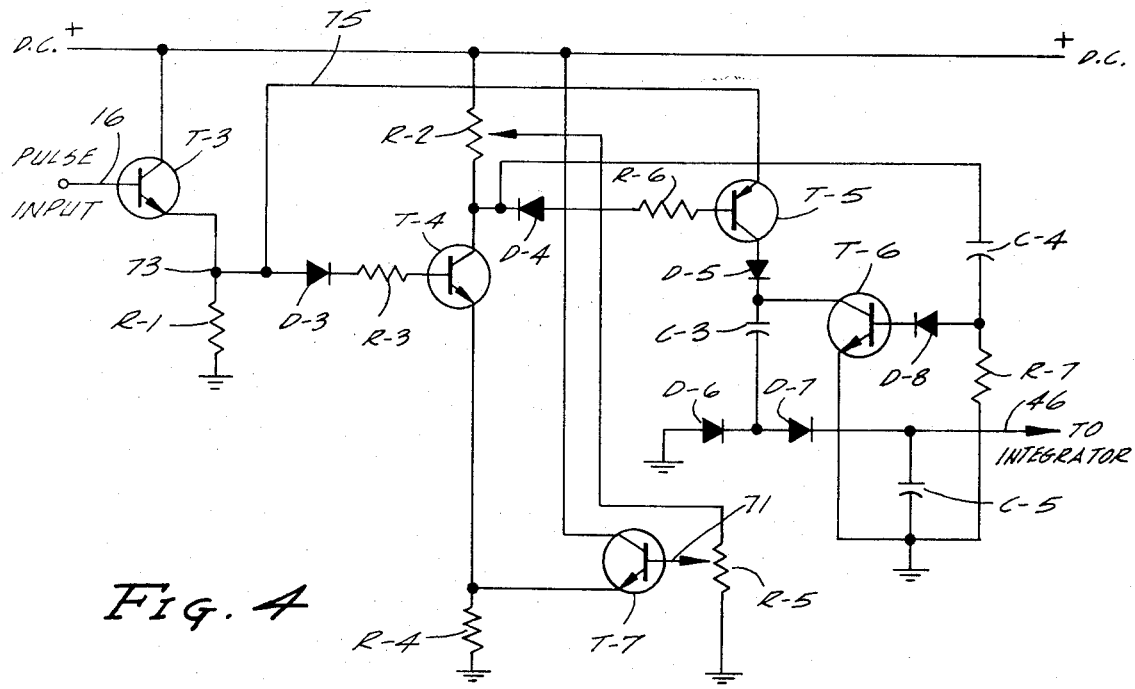
FIG. 4 is a circuit diagram of still another form of the invention.

Referring now to FIG. 1, the block diagram therein illustrates a simplified form of the invention which can be used to provide two indices, one representing the mean particle volume, and the other representing the ratio of particulate volume to the total volume of the suspension. In the case of blood, these indices could be calibrated in terms of mean cell volume, or MCV and hematocrit or HCT.

The two blocks 10 and 12 represent well-known components of the Coulter type apparatus, and are marked respectively "Coulter Aperture Tube" and "$I_{source}$, Start-Stop, Etc." The aperture tube in most Coulter apparatus provides the path of small dimensions through which the electric current from the current source ($I_{source}$) will flow, along with the sample liquid suspension. Means normally are provided for measuring the volume of the flowing suspension, for turning the apparatus on and off at the beginning and end of an experimental run, and for asperating the liquid system in the glassware to cause suspension flow, etc.

All of the above is familiar to those skilled in this art.

The signals which are produced as a result of the passage of particles through the aperture at the same time that an electric current is also in the aperture are detected by an amplifier or several amplifiers in the ordinary Coulter apparatus. The block 14 in FIG. 1 represents amplifier circuitry, but in this case is designated "Low-Z Amp" since it is preferred that the same have a low impedance output working into the electronic switch and comparator, shortly to be described.

The output of the amplifier 14 appears at 16, and such output consists of a string of pulses, each pulse representing the passage of a particle through the aperture, and the amplitude of each pulse being proportional to the size of the particle which produced it. The output signals of the amplifier 14 are applied to the terminal 18 of a comparator 20 and to the input of an electronic switch 22. The comparator 20 may be any suitable device, such as for example, a differential amplifier, having two input terminals 18 and 24, and producing an output only when the amplitude of the signal on one terminal, for example 18, exceeds the amplitude of the signal on the other terminal. The terminal 24 is maintained at a voltage level desired by means of a threshold level adjusting device 26, so that only pulses whose amplitudes exceed the chosen threshold level will produce an output at the terminal 38. The threshold level adjusting device in this case comprises a source of voltage 28 having a potentiometer 30 connected to ground, the movable contact 32 being manually adjustable to provide any suitable voltage at the terminal 24. The device 26 may be calibrated in terms of particle size.

The purpose of the electronic switch 22 is to permit pulses which appear at 16 to pass to the converter and accumulating means, but only if their amplitudes exceed the requirements which are represented by the threshold level set in the device 26. Ignoring for the moment the AND circuit 36, it can be seen that if the comparator passes a pulse at 38 which activates the electronic switch 22 through the line 40, then the output pulse at 16 will also pass through the electronic switch and appear at 42 to be applied to the pump circuit 44.

It will follow that the signals which will appear at 42 represent only those signals whose amplitude exceeded the threshold level setting determined by the position of the movable contact 32.

The signals at 42 are applied to a pump circuit 44 which converts each signal into a charge fed by way of the line 46 to the integrator 48. The integrator 48 accumulates these charges so that in effect is adds all of the signals passed by the electronic switch 22, and the voltage level of its output terminal at any time represents the accumulated signals. This voltage appears at the terminal 50 as $e_o$, an output voltage. As the signals accumulate, the voltage level at 50 will continue to rise, and the quantity represented by the voltage $e_o$ can be used for any given period of time or volume of suspension or count, as will be seen, following which the integrator may be re-set by some suitable circuitry.

The problem of coincident signals in Coulter apparatus may be effectively obviated by suitable dilution of the suspension. Otherwise, circuits may be devised to provide the needed compensation depending upon the use of the apparatus.

Consider the chart FIG. 2 which has two curves 2A and 2B. The curve 2A represents the signal at 42 and it is shown as the pulse 42, for identification. For illustrative purposes, it is assumed that the threshold level has been set at the voltage $e_{th}$. The maximum vertical excursion of the pulse is $e_{max}$ which is a voltage proportional to the size of the particle which produced the pulse. When the pulse 42 reaches the amplitude $e_{th}$, and not until then, the comparator 20 produces a control signal, activating the switch 22. The control signal is shown at 38, this being a saturation signal that commences at $t_1$ and stops at $t_2$. The pump circuit 44 normally will include a condenser that charges from $t_1$ to the maximum amplitude $e_{max}$ storing a charge defined as $e_{max} C$ (assuming the value of the capacitance of the pump circuit to be C). Then, from the time $t_p$ to the time $t_2$, and for a short time thereafter the condenser will discharge, but on account of the pumping action, this charge will be discharged into the integrator 48 which will accumulate the same with other charges previously and subsequently stored therein. The circuit capacitance of the pump circuit will always be chosen as a constant to preserve the proportionality of the charge stored with respect to signal amplitude. After a given length of time, the accumulated charge will be proportional to the total volume of all particles of amplitude greater than $e_{th}$ which were produced during that time.

In the case that the circuit described is intended to be used for the determination of MCV and/or hematocrit, for example, the factors of time and volume are easily incorporated to operate upon the signals.

Thus, for MCV, there is provided a counter 54 which may be of any suitable construction that starts the apparatus when the count begins and stops the apparatus when the count is completed. In this instance, there is a series of binary circuits $B_1, B_2, \ldots B_{n-1}$ and $B_n$, the number of which is chosen to produce a given count. Since only the pulses passing to the accumulating means are to be counted, the count signals are taken from the terminal 38, the amplitude of such count signals being of no consequence. The last binary $B_n$ is connected to apply its output signal to a phase inverter 56 that has a line at 58 connected through the switch 60 to the AND element 36 interposed between the electronic switch 22 and the terminal 38. There will have to be a signal at both the leads 38 and 58, with the switch arm of 60 on the MCV terminal, in order for the control signals to be passed to the control terminal of the switch 22. Thus, until the total count is reached, there is an output at 58 and no output at 62 from the binary element $B_n$. The final output voltage is proportional to total particulate volume of particles greater than the size threshold per $2^n$ particles, effectively dividing total volume by number as desired.

To start the count, a reset button 64 is pressed, triggering the one-shot multi-vibrator 66, which emits a reset pulse, setting all of the binary elements and the integrator to zero through the re-set lines 68 and 69. With no signal at 62, there will be a signal at 58 and the count starts. The remainder of the count is as described above.

For determining hematocrit, for example, the switch 60 is thrown to the HCT position. The conventional start-stop contacts of the Coulter apparatus at 12 combined with the manometer-syphon volume measuring device may be used to pass a given volume of suspension through the aperture of the aperture tube 10. The start lead 70 energizes a suitable logic circuit 72 to produce an output at 74, thus opening the AND gate 36. This signal remains until the stop lead 76 produces another signal that changes the state of the logic circuit 72 so that the signal at 74 is removed, and the count is complete. Knowing the volume of suspension and the dilution, the output at 50 is readily related to hematocrit.

A typical circuit suitable for use as the electronic switch 22, signal converting means 44 and charge accumulating means 48 is shown in FIG. 3. The normal non-passage condition is when the series-connected field effect transistor T–1 is off and the shunt field effect transistor T–2 is on. (Biasing circuit elements are not shown, for simplicity). When a signal appears at 38 and is applied by way of the line 40 to the base of the transistor T–1, this is now turned on thereby turning the transistor T–2 off. Signals can now be applied by way of the lead 16 to charge the condenser C–1 through the diode D–2 to ground. The charge is built up in the condenser C–1 while the signal is positive going, and after the peak is reached, the condenser C–1 is discharged, but cannot discharge through the diode D–2. It is discharged through the diode D–1, dumping its charge into the integrator 48 where it accumulates as a charge and has a voltage proportional to its charge appearing on the lead 50. The condenser C–2 is the conventional integrator feedback path.

The circuit of FIG. 4 illustrates the use of a Schmitt trigger arrangement to achieve the threshold level control and the conversion from voltage to charge. The left hand terminal designated "Pulse Input" is the equivalent of the line 16 of FIG. 1, and the terminal which is designated "To Integrator" is the equivalent of line 46 of FIG. 1.

The transistor T–7 normally is conducting and the transistor T–4 normally is non-conducting. The diode D–3 will not conduct unless the pulse which appears at 16 and passes through the input transistor T–3 has an amplitude which exceeds the combined back-bias of the transistor T–4 and the diode D–3. The back-bias of transistor T–4 is controlled by the movable contact 71 of the potentiometer R–5, and the characteristics of the transistor T–4, in turn, are controlled by the potentiometer R–2 and the biasing resistor R–4.

The output from the transistor T–3 appears at 73 and is connected to the base of the transistor T–4 and to the emitter of the transistor T–5 by way of the line 75. The transistors T–5 and T–6 normally are not conducting.

When the diode D–3 conducts, the transistors T–4 and T–5 conduct, the transistor T–7 becomes non-conducting, and the transistor T–6 remains non-conducting. The pulse which appears at the line 75 is now passed through the transistor T–5 as an electric current, since this latter transistor was switched into saturation by the transistor T–4. On the positive going portion of the input pulse, there is a current flow into the capacitor C-3 through the diodes D-5 and D-7, and to the capacitor C-5. The latter is significantly larger than the former and is connected in parallel with the integrator so as to act as an intermediate and protective storage element which feeds the integrator at an acceptable rate.

When the input pulse starts to go in the negative direction, the protective diode D-5 becomes back biased, trapping the stored charges in C-3. When the pulse voltage subsides to the vicinity of the critical voltage, depending upon the amount of hysteresis in the circuit as adjusted by R-2, the transistors T-4 and T-5 become non-conducting and T-7 conducts. At the time that the transistor T-4 is thus turned off, its collector goes positive and applies sufficient potential to the base of the transistor T-6 to turn it on via the differentiating circuit consisting of capacitor C-4 and resistor R-7 and the protective diode D-8. The size of the capacitor C-4 controls the conducting duration of the transistor T-6. When conducting, the collector of the transistor T-6 attempts to go negative and causes the capacitor C-3 to discharge through D-6 and thereby be reset in anticipation of the next input pulse on the line 16.

Figure 5:
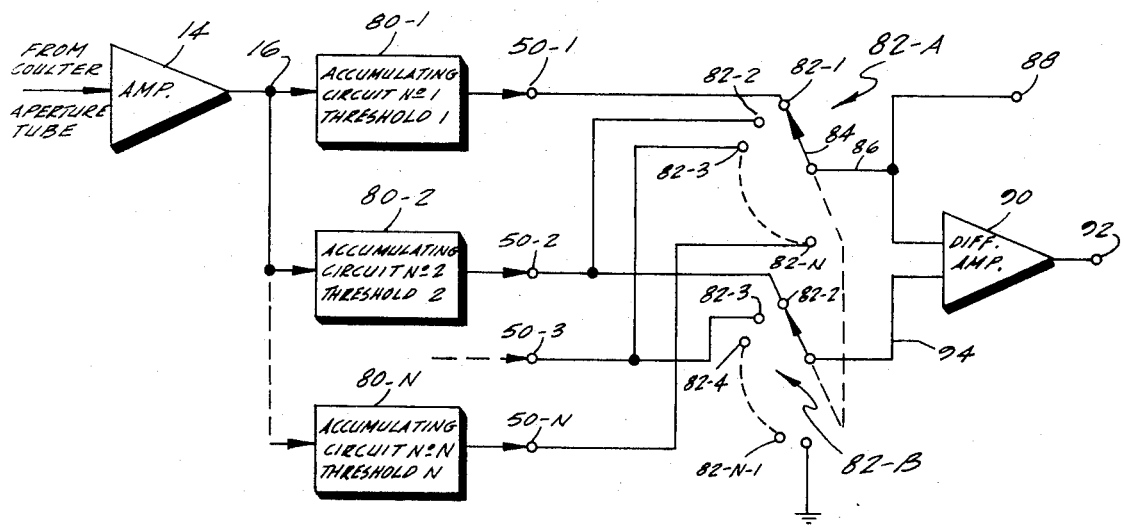
FIG. 5 is a block diagram of apparatus utilizing a plurality of circuits of the type illustrated to achieve data related to volume and/or size distribution of a particulate system.

Referring now to FIG. 5, a block diagram is there illustrated which shows a plurality of circuits of the type previously described for achieving a plurality of outputs which provide data related to the volume and/or size distribution of a particulate system.

The accumulating circuits are duplicated in a number N representing the number of threshold levels and hence the number of points on the characteristic curves it is desired to have. Thus, the circuit represented by the block 80-1 is an accumulating circuit which includes all of the elements from the lead 16 to the terminal 50 of FIG. 3, for example, so that the threshold level 1 will determine the value of the output voltage appearing at 50-1. Likewise, the circuit 80-2 will produce a different output voltage at 50-2 corresponding to the threshold level 2. Each level will be different, with the consecutive levels being adjacent. For example, the last threshold level N will be just above ground. It is understood that the signals appearing at each output terminal 50-1, 50-2, etc. respectively represent voltages which are proportional to the total volume of particulate matter represented by particles whose amplitudes are greater than the size represented by that particular threshold level. If each output is connected to a terminal of the switch 82-A respectively, as at 82-1, 82-2, 82-3 etc. to 82-N, the switch arm 84 will be able to be moved over these contacts one after the other and the signals appearing at 86 will give the points on the integral curve for each threshold level and hence size represented by the respective circuits 80-1, 80-2 . . . 80-N. The output at 88 may be read by a meter and the values recorded manually, or may be used to drive a suitable recorder or bar graph generating device.

If it is desired to obtain the differential curve, the same scheme may be used in conjunction with a differential amplifier 90 to give the differential points at 92. In this case, another wafer of the same switch shown, namely 82-B will have the adjacent contacts. These are also identified by the accumulating circuit from which derived, and the output of the respective adjacent circuits appears at 94.

What it is desired to be secured by Letters Patent of the United States is:

1. A method of ascertaining the total volume of particulate matter suspended in a quantity of liquid having particles of different size therein, said method comprising the steps of:
   A. passing the quantity of liquid through a sensing zone where each particle sensed generates an electrical signal having an amplitude which is directly proportional to the size of the individual particle sensed,
   B. converting each signal into an electrical quantity which is directly related to the amplitude of said signal and which is capable of being accumulated,
   C. accumulating all of the electrical quantities generated by particles sensed in said quantity of liquid, and
   D. deriving at least one output signal which is proportional to the total accumulated electrical quantities and hence also proportional to the total volume of particulate matter so suspended in said quantity of liquid.

2. The method as claimed in claim 1 in which the signals are grouped according to their respective amplitudes, each group being defined by at least one particle size limit, and in which each group is independently subjected to the steps A, B and C of said claim 1 whereby to derive a plurality of output signals each proportional to the total volume of particulate matter suspended in that portion of the total quantity of liquid represented by its respective group.

3. The method as claimed in claim 2 in which the amplitude information is converted into charges comprising respectively said electrical quantities and the accumulation of charges is effected by integration.

4. The method as claimed in claim 1 in which the amplitude information is converted into charges comprising respectively said electrical quantities and the accumulation of charges is effected by integration.

5. The method as claimed in claim 1 in which the quantity of liquid includes particles of a size not to be included in the measured volume, and in which the signals are separated before converting, such separation being made on the basis of discriminating against the amplitudes of those representing the undesirable sizes in said quantity of liquid so that only the signals of the desired particle sizes are converted.

6. Apparatus for producing output signal data related to the total volume of particulate matter in a quantity of liquid containing said particulate matter, utilizing the output signals from a particle analyzing device wherein a quantity of liquid containing particles of different size is caused to flow through a sensing zone including an electric current path of small dimensions where each particle sensed generates a signal having an amplitude proportional to the size of the particle sensed, said apparatus comprising:
   A. means for converting each signal as it occurs into an electrical quantity directly proportional to the amplitude of said signal without regard to its duration and capable of being accumulated,
   B. means for accumulating said quantities,
   C. means responsive to the total accumulated quantity providing an output signal proportional to said total quantity, and
   D. means for controlling the operation of said accumulating means.

7. The apparatus as claimed in claim 6 in which the converting means include a proportional electronic pump circuit and the accumulating means comprise an integrator receiving charges transferred thereto from said pump circuit.

8. The apparatus as claimed in claim 6 in which the controlling means include means for stopping the operation of the accumulating means when a predetermined volume of said quantity of liquid has flowed through said sensing zone whereby said signal output is proportional to the total particulate matter suspended in said predetermined volume.

9. The apparatus as claimed in claim 6 which includes threshold signal establishing means adjustable to inhibit the passage of the signals to the converting means unless the amplitude of said passed signals exceeds a predetermined amplitude whereby the total accumulated quantity consists only in converted signals which have respectively exceeded the amplitude of the threshold signal.

10. The apparatus as claimed in claim 9 in which the controlling means include means for stopping the operation of the accumulating means when a predetermined volume of said quantity of liquid has flowed relative to said path whereby said signal output is proportional to the total particulate matter of particles whose size exceeds that size represented by the amplitude of the threshold signal amplitude.

11. The apparatus as claimed in claim 9 in which means are provided for counting the number of signals passed to the converting means and for inhibiting the passage of signals to the converting means at a given count to obtain a signal output proportional to the mean size of particles exceeding the particle size represented by the threshold signal amplitude.

12. Apparatus for producing output signal data related to the total volume of particulate matter in a quantity of liquid containing particles of different size, said apparatus comprising:
   A. an electronic particle-sensing device which includes means for causing a quantity of liquid containing particles of different size to flow through a sensing zone including an electric field of small dimensions,
   B. means for producing analog electrical pulses respectively proportional in value to the size of particles flowing relative to said field,
   C. threshold level selecting means for producing a threshold signal for comparison with said analog electric pulses,
   D. means for comparing the said pulses with said threshold signal and having an output control signal only when said threshold signal is less than any of said analog pulses,
   E. electronic switch means operated by said control signal and effective to pass all analog pulses which exceed said threshold signal,
   F. means for converting the passed analog pulses each having an amplitude related to one of the particles sensed into respective electrical quantities each of which is directly proportional to the amplitude of said pulse and which is capable of being accumulated, and
   G. means for accumulating said quantities and producing an output signal proportional to total accumulated quantity and hence proportional to total accumulated particle volume of all particles producing passed pulses.

13. The apparatus as claimed in claim 12 including means for counting the passed pulses for any given output signal, and means for inhibiting the passage of pulses to the converting means at a given count to provide an output signal proportional to the mean particle volume of all of the particles producing passed pulses.

14. The apparatus as claimed in claim 12 including means for measuring the volume of the quantity of liquid flowing through said sensing zone whereby the said output signal will be proportional to the ratio of particle volume to liquid volume of said quantity of liquid considering the particles producing passed pulses only.

15. A multiple signal output producing device comprising a plurality of the apparatus claimed in claim 12 for use in analyzing a particulate system, in which the threshold level selecting means of each apparatus is selected to provide a threshold signal corresponding to a different size of particle of said system spread over that portion of the system to be studied, and each accumulating means produces an individual output signal proportional to the total particulate volume of all particles in the system having sizes greater than that represented by the threshold level signal of said last-mentioned accumulating means.

16. Apparatus for producing output signal data related to the total volume of particulate matter in a quantity of liquid containing said particulate matter utilizing the output signals from an electrical particle studying device wherein a quantity of liquid containing particles of different size is caused to flow through a sensing zone including an electric current path of small dimensions, said apparatus comprising:
   A. means for producing analog electrical pulses respectively proportional in amplitude to the size of particles flowing through said path,
   B. threshold level selecting means for producing a threshold signal for comparison with said analog electrical pulses.
   C. means for comparing said pulses and signal and having an output control signal only when said threshold signal is less than any said analog pulse,
   D. electronic switch means operated by said control signal and connected to pass all analog pulses which exceed said threshold signal,
   E. means for converting the passed analog pulses into respective electrical quantities each of which is directly proportional to the amplitude of one of said analog pulses and is capable of being accumulated, and
   F. means for accumulating the said quantities and having an output signal proportional to total accumulated quantity and hence proportion to total accumulated particle volume.

17. The apparatus as claimed in claim 16 including means for counting the number of analog electrical pulses occuring for any given output signal, and means for inhibiting the converting means upon attainment of a given count to obtain an output signal proportional to the mean particle volume.

18. The apparatus as claimed in claim 16 including means for measuring the volume of the quantity of liquid which flows relative to said path whereby the said output signal will be proportional to the ratio of particle volume to liquid volume of said quantity of liquid.

19. A multiple signal output producing device comprising a plurality of the apparatus claimed in claim 16 for use in analyzing the said particulate system, in which the threshold level selecting means of each apparatus is selected to provide a threshold signal corresponding to a different size of particle of said system spread over that portion of the system to be studied, and each accumulating means produces an output signal proportional to the total particulate volume of all particles in the system having sizes greater than that represented by the threshold level signal of said last-mentioned accumulating means.

20. Apparatus for producing output signal data related to the total volume of particulate matter in a quantity of liquid containing said particulate matter utilizing the output signals from an electronic particle studying device wherein a quantity of liquid containing particles of different size is caused to flow through a sensing zone including an electric current path of small dimensions, said apparatus comprising:
   A. means for producing analog electrical pulses respectively proportional in amplitude to the size of particles flowing in said path,
   B. threshold level selecting means for producing a threshold level to control the passage of said pulses,
   C. a normally inoperative charging circuit for accumulating charges each proportional to the amplitude of passed pulses,
   D. circuitry activating the charging circuit only when the amplitude of any pulse exceeds said threshold level whereby to charge said circuit to the amplitude of said pulse, but de-activating said charging circuit when the amplitude of said pulse has been passed,
   E. means for accumulating the charge of said charging circuit pulse by pulse,
   F. means activated by the termination of any pulse passed to transfer the charge of the charging cricuit to said accumulating circuit, and
   G. said accumulating means having an output terminal providing said output signal data of a value proportional to the total accumulated charge.

21. A method of ascertaining the total volume of particulate matter in a quantity of liquid having particles of different size therein, said method comprising:
   A. passing the quantity of liquid through a sensing zone where each particle sensed generates an electrical signal having an amplitude which is directly proportional to the size of the individual particle sensed,
   B. converting each signal into an electric current pulse directly proportional to the amplitude of such signal,
   C. integrating the plurality of current pulses generated from said measure of suspension, and
   D. deriving at least one output signal which is proportional to the total charge obtained by integrating said current pulses and therefore proportional to the total volume of particulate matter in said quantity of liquid.

22. Apparatus for producing output signal data related to the total volume of particulate matter in a quantity of liquid containing said particulate matter utilizing the output signals from a particle analyzing device wherein a quantity of liquid containing particles of different size is caused to flow through a sensing zone including an electric current path of small dimensions where each particle sensed generates a signal having an amplitude proportional to the size of the particle sensed, said apparatus comprising:
   A. means for converting each signal as it occurs into an electric current pulse directly proportional to the amplitude of said signal without regard to its duration,
   B. means for integrating the plurality of current pulses generated from said quantity of liquid,
   C. means responsive to the total charge obtained by integrating said current pulses for providing an output signal proportional to said total charge, and
   D. means for controlling the operation of said integrating means.

* * * * *